(12) United States Patent
Moribe

(10) Patent No.: US 11,825,245 B2
(45) Date of Patent: Nov. 21, 2023

(54) IMAGE PROCESSING DEVICE, IMAGE DISPLAY SYSTEM, IMAGE PROCESSING METHOD, AND PROGRAM

(71) Applicant: CANON KABUSHIKI KAISHA, Tokyo (JP)

(72) Inventor: Shoei Moribe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 17/026,899

(22) Filed: Sep. 21, 2020

(65) Prior Publication Data

US 2021/0006758 A1 Jan. 7, 2021

Related U.S. Application Data

(63) Continuation of application No. PCT/JP2018/048477, filed on Dec. 28, 2018.

(30) Foreign Application Priority Data

Mar. 27, 2018 (JP) .................................. 2018-060107

(51) Int. Cl.
*G09G 3/00* (2006.01)
*G09G 5/377* (2006.01)
(Continued)

(52) U.S. Cl.
CPC ......... *H04N 9/3182* (2013.01); *G03B 21/134* (2013.01); *G09G 3/002* (2013.01);
(Continued)

(58) Field of Classification Search
None
See application file for complete search history.

(56) References Cited

U.S. PATENT DOCUMENTS 9,894,250 B2   2/2018 Moribe
10,026,156 B2  7/2018 Moribe
(Continued)

FOREIGN PATENT DOCUMENTS

JP  2000-175062 A  6/2000
JP  2008-122558 A  5/2008
(Continued)

OTHER PUBLICATIONS

International Search Report issued in International Application No. PCT/JP2018/048477 dated Mar. 26, 2019, pp. 1-2.

*Primary Examiner* — Matthew Yeung
(74) *Attorney, Agent, or Firm* — Carter, DeLuca & Farrell LLP

(57) ABSTRACT

The present invention provides an image processing device that reproduces the color of an input image more faithfully under different environment illumination without the need to prepare a different signal separation LUT for different environment illumination. An image processing device in one embodiment of the present invention generates data for generating an overlap image by overlapping an image formed by an image forming device and an image projected by an image projection device. The image processing device includes a generation unit configured to, based on input image data, generate first image data for the image forming device and second image data for the image projection device, a first acquisition unit configured to acquire environment illumination information relating to environment illumination in generating the overlap image, and a correction unit configured to correct the second image data based on the environment illumination information.

14 Claims, 12 Drawing Sheets

(51) Int. Cl.
*H04N 9/31* (2006.01)
*G03B 21/134* (2006.01)
*H04N 1/00* (2006.01)
*H04N 1/60* (2006.01)

(52) U.S. Cl.
CPC ......... *G09G 5/377* (2013.01); *H04N 1/00835* (2013.01); *H04N 1/6086* (2013.01); *G09G 2360/144* (2013.01)

(56) References Cited

U.S. PATENT DOCUMENTS

| | | |
|---|---|---|
| 10,205,854 B2 | 2/2019 | Shimada et al. |
| 10,506,135 B2 | 12/2019 | Moribe et al. |
| 10,523,844 B2 | 12/2019 | Moribe et al. |
| 10,638,020 B2 | 4/2020 | Ochiai et al. |
| 2008/0204378 A1* | 8/2008 | Park ................ G09G 3/3208 345/77 |
| 2010/0104176 A1* | 4/2010 | Hayase ............. H04N 1/6088 382/162 |
| 2013/0162814 A1* | 6/2013 | Shin .................. H04N 7/18 348/135 |
| 2020/0130353 A1 | 4/2020 | Moribe |

FOREIGN PATENT DOCUMENTS

| | | |
|---|---|---|
| JP | 2008-145915 A | 6/2008 |
| JP | 2010-103863 A | 5/2010 |
| JP | 2017-212516 A | 11/2017 |

* cited by examiner

| TRISTIMULUS VALUES | | | SIGNAL VALUES | | | | | |
|---|---|---|---|---|---|---|---|---|
| | | | PRINTER | | | PROJECTOR | | |
| X | Y | Z | R | G | B | R | G | B |
| 0.637 | 0.618 | 0.454 | 0 | 0 | 0 | 0 | 0 | 0 |
| 20.1 | 16.7 | 39.9 | 0 | 0 | 13.3 | 0 | 0 | 0 |
| 39.5 | 32.8 | 79.4 | 0 | 0 | 26.6 | 0 | 0 | 11.0 |
| ... | ... | ... | ... | ... | ... | ... | ... | ... |
| 311 | 258 | 632 | 0 | 0 | 255 | 0 | 0 | 255 |
| 21.3 | 39.5 | 17.3 | 0 | 12.1 | 0 | 0 | 1.3 | 0 |
| ... | ... | ... | ... | ... | ... | ... | ... | ... |
| 591 | 623 | 730 | 255 | 255 | 255 | 255 | 255 | 255 |

FIG.2

IMAGE PROCESSING DEVICE, IMAGE DISPLAY SYSTEM, IMAGE PROCESSING METHOD, AND PROGRAM

CROSS-REFERENCE TO RELATED APPLICATIONS

This application is a Continuation of International Patent Application No. PCT/JP2018/048477, filed Dec. 28, 2018, which claims the benefit of Japanese Patent Applications No. 2018-060107 filed Mar. 27, 2018, all of which are hereby incorporated by reference herein in their entirety.

BACKGROUND OF THE INVENTION

Field of the Invention

The present invention relates to a technique to display an image by using a printer and a projector.

Background Art

In recent years, the digital camera or the like has been increasing in number, which comprises the high dynamic range image (HDR image) acquisition function to store an image in which an amount of information on the portion from the highlight portion to the shadow portion is saved in a case where an object having a wide dynamic range is captured. The display device and the output device are required to faithfully reproduce the HDR image such as this. In particular, a projector capable of displaying an image on a large screen as a display device, a large-size printer capable of outputting a large-size sheet with a high definition as an output device, and the like are capable of representing a real thing (object) in an impressive size, and therefore, their utilization is promising.

However, the dynamic range and the color gamut of an image, which the projector, the large-size printer, and the like can handle, are not sufficient to reproduce an HDR image. Because of this, in a case where an HDR image is displayed or output by these devices, tone compression processing or gamut mapping processing, called tone mapping, is performed for an input image (that is, HDR image), As a result of that, the output image that is output from these devices is no longer one faithful to the input image.

Consequently, a technique has been proposed Which reproduces the dynamic range and the color gamut of an input image more faithfully by using a plurality of devices. Patent Document 1 has disclosed that an input image is represented with a wider dynamic range and a wider color gamut by overlapping a print image by a printer and a projection image by a projector. Specifically, by using a signal separation LUT (lookup table) generated based on the spectral distribution characteristic in the projector and the spectral reflectivity characteristic in the printer, the input image is converted into an image signal for the projector and an image signal for the printer. Then, based on the converted image signals, the images formed by the projector and the printer respectively are overlapped. Further, Patent Document 1 has also disclosed that the color of an input image is reproduced faithfully by taking into consideration the influence of a light source (hereinafter, also referred to as environment illumination) in a viewing environment of an image at the time of creating the signal separation LUT.

CITATION LIST

Patent Literature

Patent Literature: Japanese Patent Laid-Open No. 2010-103863

SUMMARY OF THE INVENTION

However, with the technique disclosed in Patent Document 1, it is necessary to prepare a different signal separation LUT for different environment illumination in order to deal with the different environment illumination, and therefore, the amount of data on the signal separation LUT increases.

Consequently, an object of the present invention is to reproduce the color of an input image more faithfully under different environment illumination without the need to prepare a different signal separation LUT for different environment illumination.

An image processing device in one embodiment of the present invention generates data for generating an overlap image by overlapping an image formed by an image forming device and an image projected by an image projection device. The image processing device includes: a generation unit configured to, based on input image data, generate first image data for the image forming device and second image data for the image projection device; a first acquisition unit configured to acquire environment illumination information relating to environment illumination in generating the overlap image; and a correction unit configured to correct the second image data based on the environment illumination information.

Further features of the present invention will become apparent from the following explanation of embodiments, which is given with reference to the attached drawings.

BRIEF DESCRIPTION OF THE DRAWINGS

FIG. 2 is a diagram showing an example of a signal separation LUT 203;

DESCRIPTION OF THE EMBODIMENTS

In the following, embodiments of the present invention are explained in detail with reference to the drawings. The following embodiments are not intended to limit the present invention and all combinations of features explained in the present embodiments are not necessarily indispensable to the present invention. Explanation is given by attaching the same symbol to the same configuration.

First Embodiment

In the present embodiment an example is explained in which an image projection device acquires environment illumination (that is, environment illumination information) by using a spectral sensor and compensates for a color variation that is given to an overlap color by a change in the environment illumination by a projection image.
(Configuration of Device)

Figure 1:
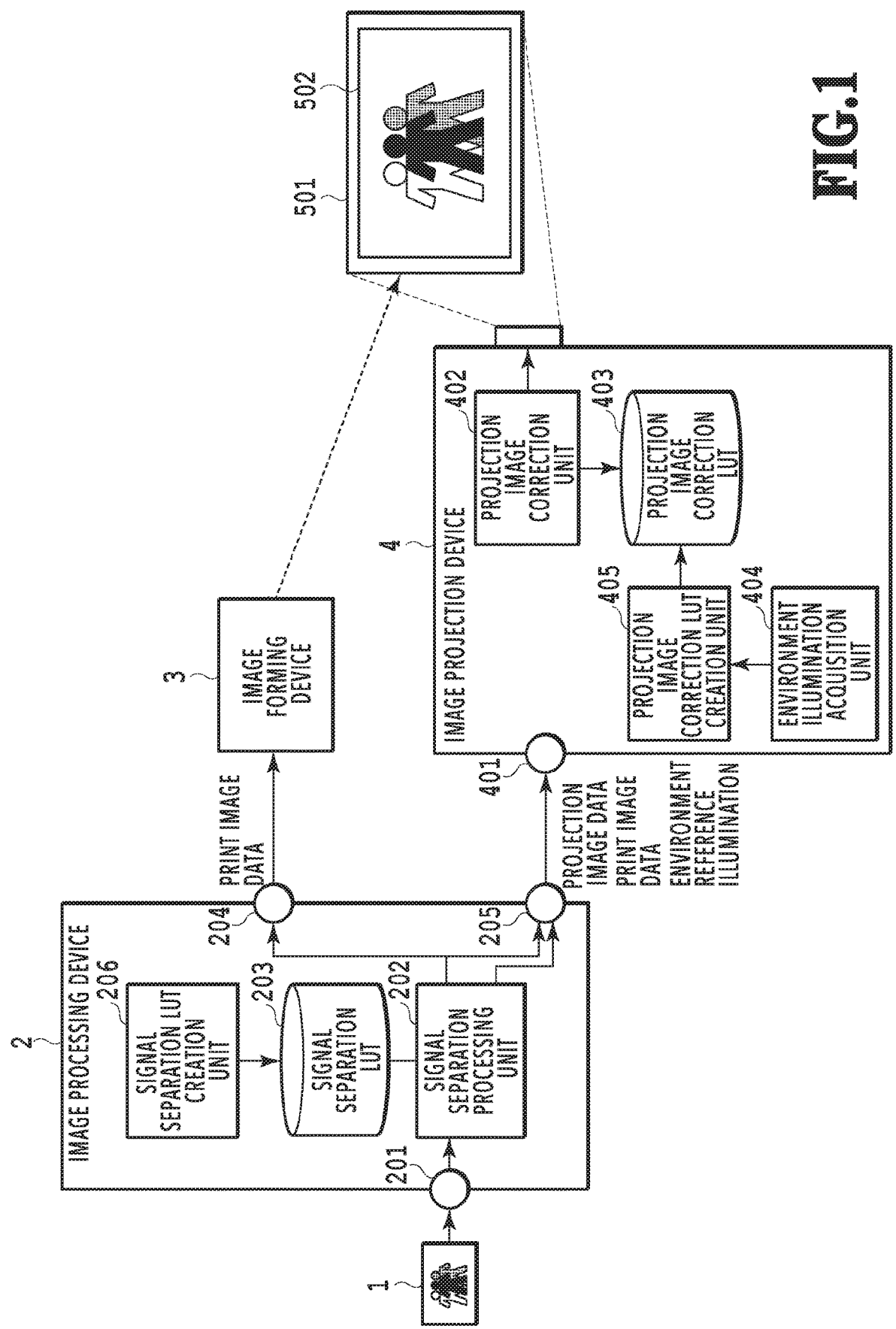
FIG. 1 is a block diagram showing a configuration of an image display system in a first embodiment.

FIG. 1 is a block diagram showing the configuration of an image display system in the present embodiment. In FIG. 1, 1 indicates an input image. 2 indicates an image processing device (PC), 3 indicates an image forming device (printer), and 4 indicates an image projection device (projector), respectively. It is possible for the image display system to display an overlap image that reproduces the dynamic range and the color gamut of the input image 1 more faithfully by overlapping a projection image 502 projected by the image projection device 4 onto a print image 501 formed on a printing medium by the image forming device 3.

In the following embodiment, explanation is given by taking the image forming device 3 as an ink jet printer and the image projection device 4 as a liquid crystal projector.

The image processing device 2 may be implemented by, for example, a printer driver installed in a general personal computer. In such a case, each unit of the image processing device 2 to be explained in the following is implemented by a CPU of a computer executing a program stored in a predetermined memory or a storage device. Further, as another configuration, for example, a configuration may be accepted in which the image processing device 2 includes one of the image forming device 3 and the image projection device 4 or both.

The image processing device 2 receives input image data from an image data input terminal 201. The input image data is sent to a signal separation processing unit 202. In the present embodiment, tristimulus values Xt, Yt, Zt, which are reproduction targets of each pixel of an overlap image, are input as input image data.

The input image data is not limited to that described above and it may also be possible to input a three-channel color image in which each of RGB is represented by eight bits as an input image. In such a case, the image processing device 2 comprises a color conversion processing unit, not shown schematically, and performs conversion processing from RGB into CIEXYZ (XYZ color space defined by CIE (International Commission on Illumination)) for each pixel of the input image. By doing so, the image processing device 2 acquires the tristimulus values Xt, Yt, Zt, which are reproduction targets of an overlap image.

The signal separation processing unit 202 generates print image data to be sent out to the image forming device 3 and projection image data to be sent out to the image projection device 4 from the above-described tristimulus values Xt, Yt, Zt (that is, input image data). At this time, the signal separation processing unit 202 performs signal separation processing (that is, image data generation processing) by referring to a signal separation LUT (lookup table) 203.

FIG. 2 shows an example of the signal separation LUT 203 in the present embodiment. As shown schematically, in the signal separation LUT 203, combinations of printer RGB and projector RGB, which correspond to each grid point of the tristimulus values XYZ, are stored. These combinations are created in advance so that the tristimulus values of the grid point and the tristimulus values of the overlap image are equal. The creation of the signal separation LUT 203 is performed by a signal separation LUT creation unit 206. Details of signal separation LUT creation processing will be described later.

The print image data calculated by the signal separation processing unit 202 is sent out from an output terminal 204 to the image forming device 3. The image forming device 3 forms the print image 501 by using the acquired print image data.

On the other hand, from an output terminal 205, both the projection image data and the print image data are sent out to the image projection device 4. Further, information on environment reference illumination is also sent out. Here, the environment reference illumination is environment illumination used at the time of calculating XYZ values of an overlap color in creating the signal separation LUT 203. Details will be described later.

The image projection device 4 receives the projection image data, the print image data, and the information on the environment reference illumination from an input terminal 401.

The projection image data is corrected by a projection image correction unit 402. That is, the projection image correction unit 402 functions as a projection image data correction unit. At this time, the projection image correction unit 402 corrects the projection image data by referring to a projection image correction LUT 403.

Like the signal separation LUT 203, the projection image correction LUT 403 is an LUT in which the printer RGB values, the projector RGB values, and XYZ values of an overlap color are stored. However, a relationship of input/output is different. That is, the signal separation LUT 203 is an LUT of XYZ-RGBRGB in which XYZ values are the input and the printer RGB values and the projector RGB values are the output. On the other hand, the projection image correction LUT 403 is an LUT of RGBXYZ-RGB in which the printer RGB values and XYZ values are the input and the projector RGB values are the output.

The projection image correction LUT 403 is created by a projection image correction LUT creation unit 405. Details of projection image correction LUT creation will be described later.

An environment illumination acquisition unit 404 acquires environment illumination information on an environment in which an overlap image is displayed. The acquired environment illumination information is sent out to the projection image correction LUT creation unit 405.

The projection image correction LUT creation unit 405 creates the projection image correction LUT 403 in a case where the environment illumination is different from the environment reference illumination.
(Signal Separation Processing in Signal Separation Processing Unit 202)

Figure 3:
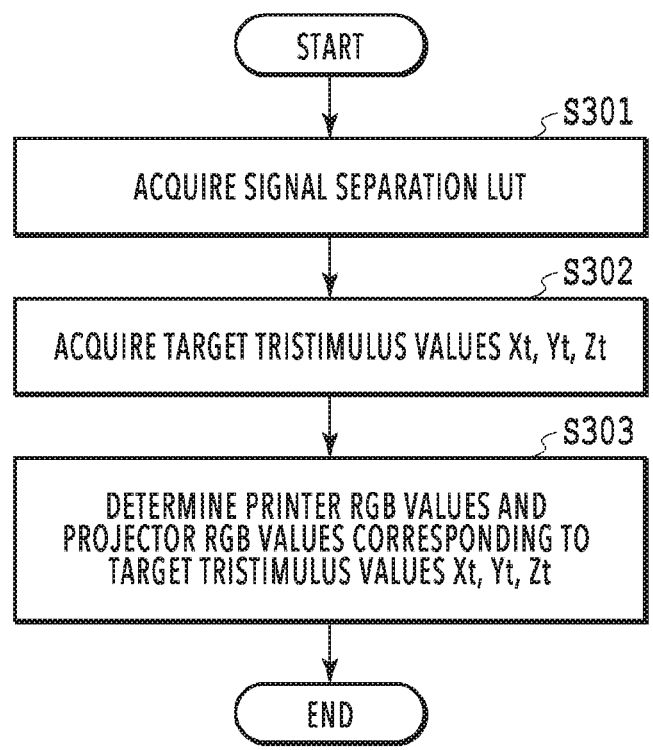
FIG. 3 is a diagram showing a flowchart of signal separation processing.

In the following, by using a flowchart shown in FIG. 3, a flow of signal separation processing in the signal separation processing unit 202 is explained. The series of processing shown in the flowchart is performed by the CPU loading a program stored in the ROM onto the RAM and executing the program. Alternatively, it may also be possible to implement a part or all of the functions at steps in the flowchart by hardware, such as ASIC and an electronic circuit. Symbol "S" in the explanation of each piece of processing means a step in the flowchart. This is also true with other flowcharts.

First, at S301, the signal separation processing unit 202 acquires the signal separation LUT 203.

Next, at S302, the signal separation processing unit 202 acquires the tristimulus values Xt, Yt, Zt (that is, input image data), which are reproduction targets, from the image data input terminal 201. At the time of acquisition, it may also be possible to acquire the tristimulus values Xi, Yt, Zt, which are reproduction targets of the entire image, and load them within a memory, not shown schematically, or to repeatedly perform acquisition and processing for one pixel each time.

Next, at S303, the signal separation processing unit 202 calculates projector RGB values and printer RGB values for each pixel from the target tristimulus values Xt, Yt, Zt of each pixel by a well-known conversion method, such as interpolation processing, by using the above-described signal separation LUT. In the interpolation processing, from the projector RGB values and the printer RGB values stored in the signal separation LUT 203, the projector RGB values and the printer RGB values of each pixel are calculated respectively by the publicly known tetrahedral interpolation processing.

By the processing at S301 to S303 explained above, it is possible to calculate the printer RGB values and the projector RGB values that reproduce the reproduction-target tristimulus values Xt, Yt, Zt as an overlap image.

(Creation Method of Signal Separation LUT 203)

Figure 4:
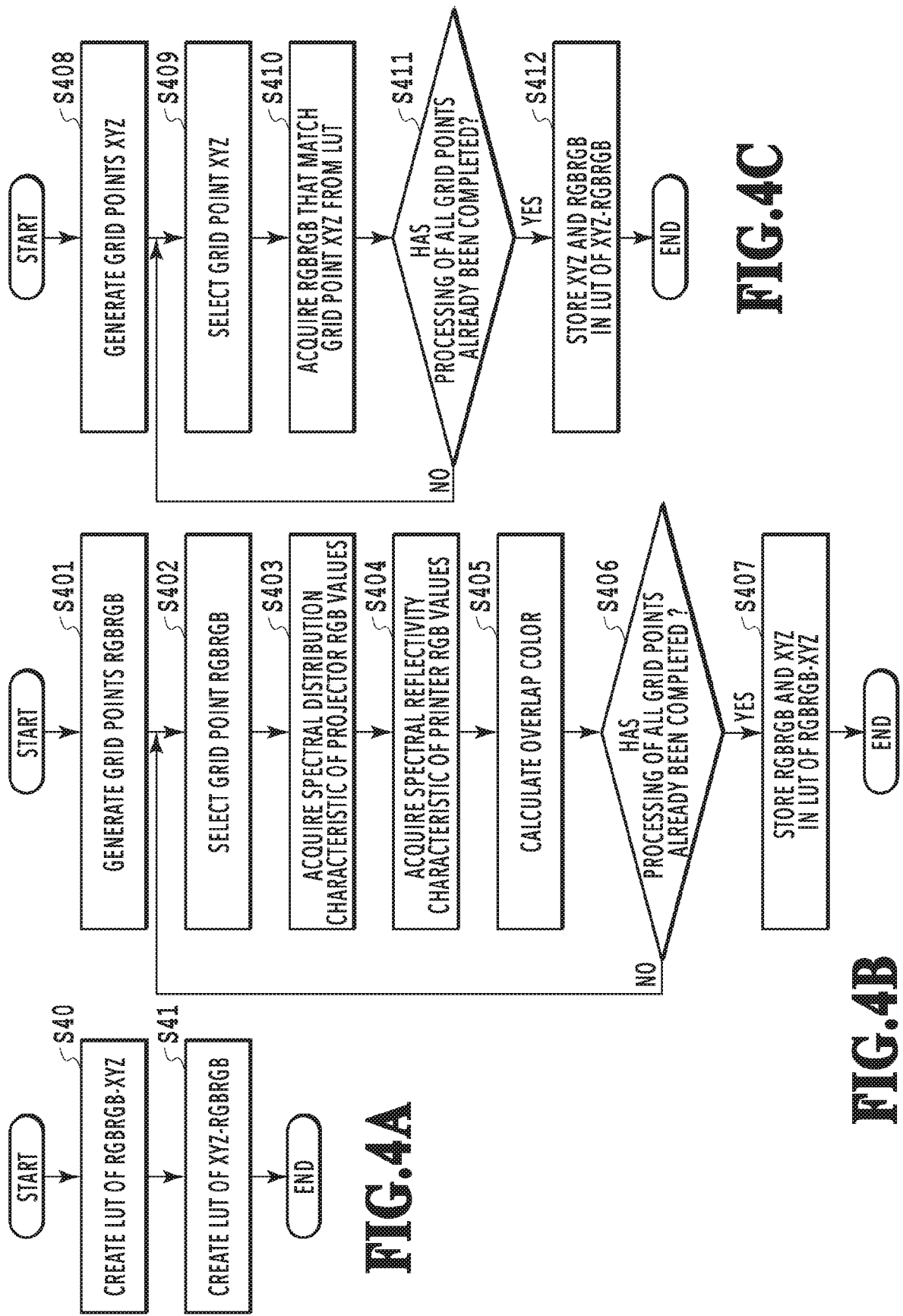
FIG. 4A to FIG. 4C are each a diagram showing a flowchart of creating the signal separation LUT 203.

In the following, with reference to FIG. 4A to FIG. 4C, a creation method of the signal separation LUT 203 in the signal separation LUT creation unit 206 is explained.

As shown in FIG. 4A, the signal separation LUT creation unit 206 first creates an LUT of RGBRGB-XYZ (S40). In this LUT, the printer RGB values and the projector RGB values are the input and XYZ values of an overlap color are the output. Details of S40 will be described later.

Next, the signal separation LUT creation unit 206 creates the signal separation LUT 203 of XYZ-RGBRGB by applying the LUT of RGBRGB-XYZ in the opposite direction using the interpolation processing (S41). Details of S41 will be described later.

(Creation of LUT of RGBRGB-XYZ)

FIG. 4B is a diagram showing the flowchart of the creation processing of the LUT of RGBRGB-XYZ (S40).

First, at S401, the signal separation LUT creation unit 206 generates RGBRGB grid signals. For example, RGB grid values are generated to have five grids per color at equal intervals for the printer RGB values and the projector RGB values, respectively. In this case, the number of grid signals is 15,625, which is five (grids) to the sixth power.

Next, at S402, the signal separation LUT creation unit 206 acquires one RGBRGB value corresponding to one grid point among the grid signals generated at S401.

Then, at S403, the signal separation LUT creation unit 206 acquires the spectral distribution characteristic of the image projection device 4, which corresponds to the projector RGB values acquired at S402. The spectral distribution characteristic of the image projection device 4 has been obtained by measuring in advance the spectral distribution for predetermined RGB values and stored as a spectral distribution profile. In a case where RGB values that match the RGB values of interest are not included in the spectral distribution profile, the spectral distribution characteristic for the RGB values of interest is calculated by interpolation processing or the like.

Next, at S404, the signal separation LUT creation unit 206 acquires the spectral reflectivity characteristic of the image forming device 3, which corresponds to the printer RGB values acquired at S402. The spectral reflectivity character-istic of the image forming device 3 has been obtained by measuring in advance a patch printed on a target medium based on predetermined RGB values and so on and stored as, for example, a spectral reflectance profile. In a case where RGB values that match the RGB values of interest are not included in the spectral reflectance profile, the spectral reflectivity characteristic for the RGB values of interest is calculated by interpolation processing or the like.

Next, at S405, the signal separation LUT creation unit 206 calculates the XYZ values, which is an overlap color in a case where the projection color based on the projector RGB values and the print color based on the printer RGB values, which are acquired at S402, by formula (1) below.

$$X(rgb1, rgb2) = \int \{S\,prj(rgb1, \lambda) + S\,ill(\lambda)\} R\,prn(rgb2, \lambda) x(\lambda) d\lambda$$

$$Y(rgb1, rgb2) = \int \{S\,prj(rgb1, \lambda) + S\,ill(\lambda)\} R\,prn(rgb2, \lambda) y(\lambda) d\lambda$$

$$Z(rgb1, rgb2) = \int \{S\,prj(rgb1, \lambda) + S\,ill(\lambda)\} R\,prn(rgb2, \lambda) z(\lambda) d\lambda \quad (1)$$

In formula (1), rgb1 and rgb2 are the projector RGB values and the printer RGB values, respectively, and X (rgb1, rgb2), Y (rgb1, rgb2), Z (rgb1, rgb2) are XYZ values of an overlap color corresponding to combinations of both of RGB values. Further, λ indicates the wavelength, S pij (rgb1, λ) is the spectral distribution of the projected light for rgb1, and R prn (rgb2, λ) is the spectral reflectivity of the printed matter for rgb2. Furthermore, S ill (λ) is the spectral distribution of the environment illumination and x (λ), y (λ), z (λ) are XYZ color matching functions of the two-degree field of view. That is, the printed matter is irradiated with light obtained by adding the spectral distribution of the projected light and the spectral distribution of the environment illumination and what is reflected as the product with the spectral reflectivity of the image forming device is the spectral distribution of the overlap color. Then, what is obtained by performing integration after weighting this with the XYZ color matching functions is the XYZ values of the overlap color.

In the present embodiment, as the environment illumination S ill (λ), the spectral distribution of CIE daylight D50 is used. However, the environment illumination S ill (λ) is not limited and in a case where, for example, it is possible to acquire/estimate the spectral distribution of the environment illumination under which the overlap image is displayed, it is desirable to use the spectral distribution.

Next, at S406, the signal separation LUT creation unit 206 determines whether or not the XYZ values for all the grid signals generated at S401 have been calculated. In a case where all the XYZ values have already been calculated, the processing advances to S407 and in the other case, the processing returns to S402 and the processing for the grid signal for which the XYZ values have not been calculated yet is performed.

Next, at S407, the signal separation LUT creation unit 206 creates the LUT of RGBRGB-XYZ by associating the RGBRGB signals generated at S401 and the XYZ signals calculated at S405 with each other.

By the above, the creation processing of the LUT of RGBRGB-XYZ (S40) is completed and then the creation processing of the LUT of XYZ-RGBRGB (S41) is started.

(Creation of LUT of XYZ-RGBRGB)

FIG. 4C is a diagram showing the flowchart of the creation processing of the LUT of XYZ-RGBRGB (S41).

First, at S408, the signal separation LUT creation unit 206 generates XYZ grid signals. In the present embodiment, the XYZ values equally distributed within the reproducible area of XYZ values calculated at S405 are generated.

Next, at S409, the signal separation LUT creation unit 206 acquires the XYZ values of one color, which correspond to one grid point among the grid signals generated at S408.

Then, at S410, the signal separation LUT creation unit 206 acquires the projector RGB values and the printer RGB values, which correspond to the XYZ values acquired at S409, from the LUT of RGBRGB-XYZ created at S407. In a case where the XYZ values that match the XYZ values of interest are not included, the projector RGB values and the printer RGB values for the XYZ values of interest are calculated by interpolation processing or the like.

Next, at S411, the signal separation LUT creation unit 206 determines whether or not the RGBRGB values for all the grid signals generated at S408 have been calculated. In a case where all the values have already been calculated, the processing advances to S412 and in the other case, the processing returns to S409 and the processing for the grid signal for which the RGBRGB values have not been calculated yet is performed.

Next, at S412, the signal separation LUT creation unit 206 creates the signal separation LUT 203 of XYZ-RGBRGB by associating the XYZ signals generated at S408 and the RGBRGB signals calculated at S410 with each other.

By the above, the creation processing of the signal separation LUT 203 is completed.

(Correction Processing in Projection Image Correction Unit 402)

In the following, by using the flowchart shown in FIG. 5, the flow of the projection image correction processing in the projection image correction unit 402 is explained.

First, at S501, the projection image correction unit 402 acquires the projection image correction LUT 403.

Next, at S502, the projection image correction unit 402 acquires the printer RGB values, the projector RGB values, and the environment reference illumination from the input terminal 401.

Next, at S503, the projection image correction unit 402 calculates the XYZ values of the overlap image under the environment reference illumination for each pixel. The calculation of the overlap color is the same as the processing at S405 in FIG. 4 described above and formula (1) is used.

Then, at S504, from the XYZ values of the overlap image and the printer RGB values, the projector RGB values for each pixel are calculated by using the projection image correction LUT 403.

By the processing at S501 to S504 explained above, it is possible to correct the projector RGB values in accordance with a change in the environment illumination (that is, different environment illumination).

(Creation Method of Projection Image Correction LUT 403)

In the following, with reference to FIG. 6A and FIG. 6B, details of the projection image correction LUT creation processing in the projection image correction LUT creation unit 405 are explained.

Figure 6A:
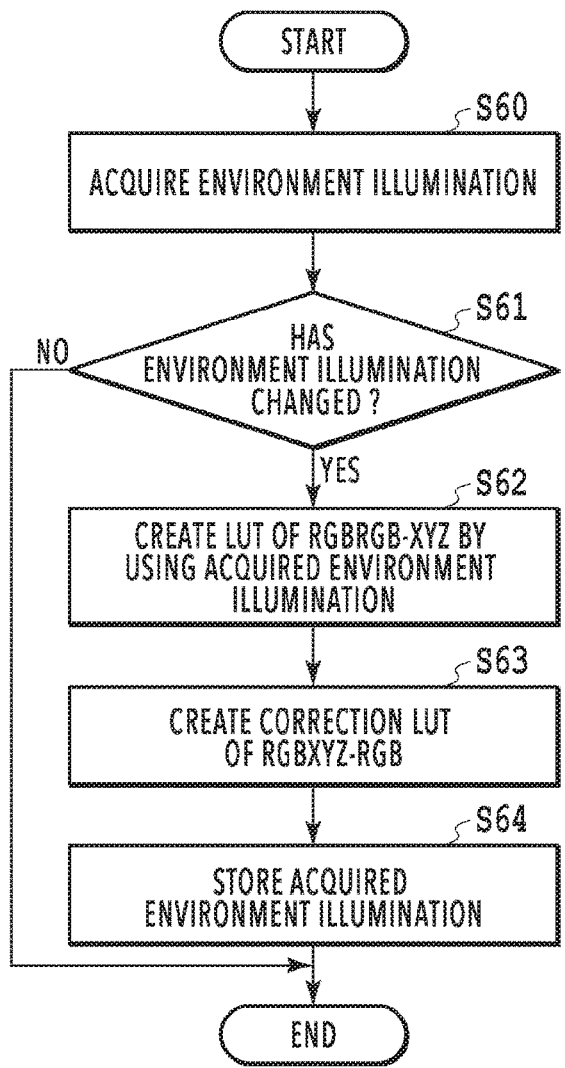
FIG. 6A and FIG. 6B are each a diagram showing a flowchart of creating a projection image correction LUT 403.

FIG. 6A shows the flowchart of the projection image correction LUT creation processing.

First, at S60, the projection image correction LUT creation unit 405 acquires the environment illumination from the environment illumination acquisition unit 404.

Next, at S61, the projection image correction LUT creation unit 405 determines whether the acquired environment illumination has changed from the supposed environment illumination. Here, the supposed environment illumination is the environment illumination used at the time of creating the projection image correction LUT previously, in the initial state, the supposed environment illumination is the environment reference illumination S ill (λ) and replaced with the acquired environment illumination after the projection image correction LUT creation processing. In a case where it is determined that the acquired environment illumination has not changed, the creation of the projection image correction LUT is not necessary, and therefore, the processing is terminated. On the other hand, in a case where it is determined that the acquired environment illumination has changed, the processing advances to S62.

At S62, the projection image correction LUT creation unit 405 creates the LUT of RGBRGB-XYZ. This processing is the same as the processing at S40 in FIG. 4B, and therefore, explanation is omitted. However, at S62, the projection image correction LUT creation unit 405 calculates XYZ values by using the environment illumination acquired from the environment illumination acquisition unit 404 in place of the environment reference illumination S ill (λ) in the calculation of the overlap color at S405.

Next, at S63, the projection image correction LUT creation unit 405 creates the projection image correction LUT of RGBXYZ-RGB. In this LUT, the printer RGB values and XYZ values of the overlap color are the input and the projector RGB values are the output.

Figure 6B:
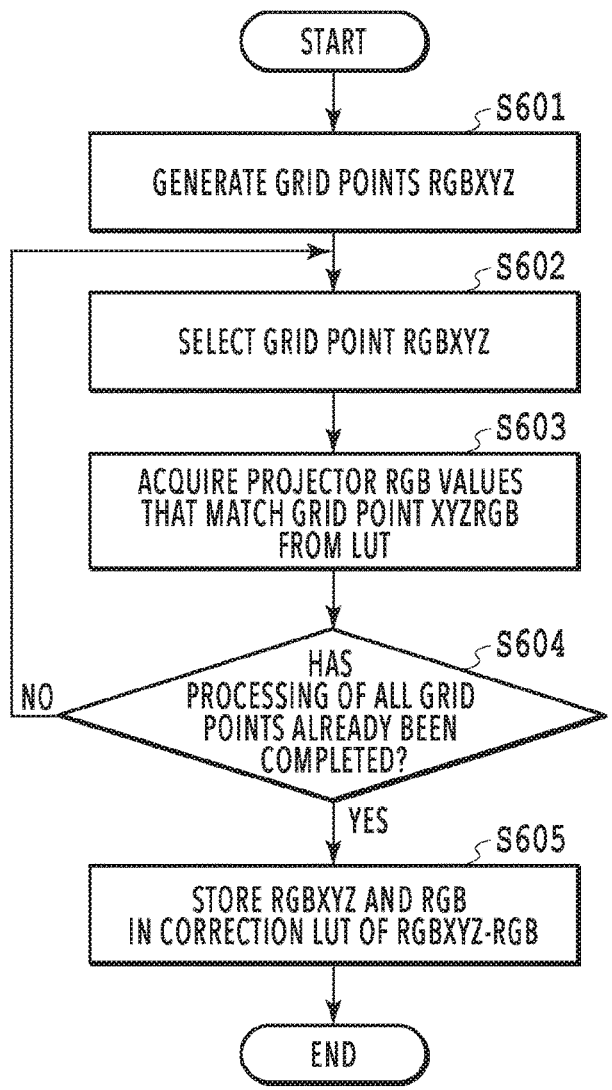

FIG. 6B is the flowchart showing details of the processing at S63.

First, at S601, the projection image correction LUT creation unit 405 generates RGBXYZ grid signals. In the present embodiment, values are generated to have five grids per color at equal intervals for XYZ values and the printer RGB values, respectively. In this case, the number of grid signals is 15,625, which is five (grids) to the sixth power.

Next, at S602, the projection image correction LUT creation unit 405 acquires one set of RGBXYZ values corresponding to one grid point among the grid signals generated at S601.

Then, at S603, the projection image correction LUT creation unit 405 acquires the projector RGB values corresponding to the RGBXYZ values acquired at S602. At this time, the LUT of RGBRGB-XYZ created at S62 is referred to and in a case where the RGBXYZ values that match the RGBXYZ values of interest are not included, the projector RGB values for the RGBXYZ values of interest are acquired by interpolation processing or the like.

Next, at S604, the projection image correction LUT creation unit 405 determines whether or not the projector RGB values for all the grid signals have been calculated. In a case where all the projector RGB values have already been calculated, the processing advances to S605 and in the other case, the processing returns to S602 and the processing for the grid signal for which the projector RGB values have not been calculated yet is performed.

Next, at S605, the projection image correction LUT creation unit 405 creates the projection image correction LUT 403 of RGBXYZ-RGB by associating the RGBXYZ signals generated at S601 and the projector RGB signals calculated at S603 with each other.

By the above, the processing at S63 is completed.

Next, at S64, the projection image correction LUT creation unit 405 stores the acquired environment illumination. The environment illumination stored here is the supposed environment illumination at S61 described above and referred to in a case where the projection image correction LUT 403 is created again.

By the above, the creation processing of the projection image correction LUT 403 is completed.

As explained above, according to the present embodiment, it is possible to reproduce the color of an input image more faithfully by acquiring the environment illumination by using a spectral sensor and compensating for the influence given to the overlap color by a change in the environment illumination by a projection image.

Modification Example

In the present embodiment, the example is explained in which the input to the image projection device 4 is the three-channel projector RGB values, but the kind of signal is not limited. For example, in a case where the image projection device 4 is a multi-band projector capable of spectral reproduction, spectral signal values of three or more channels are input. In such a case, it is possible to directly compensate for the difference of the change in the environment illumination spectrally in the projection image correction processing shown in FIG. 5, and therefore, the acquisition of the printer RGB values (S502) and the overlap color calculation processing (S503) are not indispensable.

Figure 5:
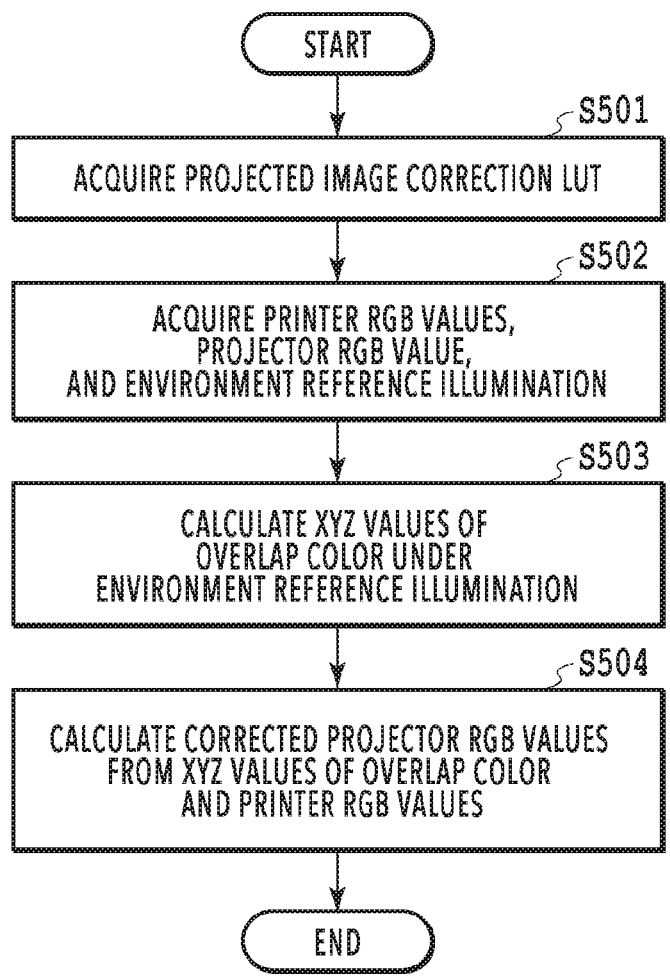
FIG. 5 is a diagram showing a flowchart of projection image correction processing.

Further, in the present embodiment, the configuration is such that the overlap color under the environment reference illumination is calculated by using formula (1) at S503 of the projection image correction processing shown in FIG. 5, but the overlap color calculation method is not limited. For example, it may also be possible to use the LUT of RGBRGB-XYZ created at S40.

Further, in the present embodiment, the example is explained in which the environment illumination is acquired by using a spectral sensor as the environment illumination acquisition unit 404, but the spectral sensor is expensive compared to a general color sensor, and therefore, an increase in cost of the device will result. Consequently, for example, it may also be possible to design a configuration in which an RGB color sensor is used in place of the spectral sensor and the spectral distribution of the environment illumination is estimated. In such a case, it is possible to estimate the spectral distribution of the environment illumination from the RGB values of the acquired environment illumination by creating/storing in advance a table in which RGB color sensor values and the spectral distribution are associated with each other under a plurality of kinds of known environment illumination. Off course, it may also be possible to store the above-described correspondence relationship as a mathematical formula.

Further, in the present embodiment, the example is explained in which whether the environment illumination has changed from the supposed environment illumination is determined and in a case where it is determined that the environment illumination has changed, the projection image correction processing is performed, but the timing of execution is arbitrary. For example, it may also be possible to design a configuration in which a user specifies the execution.

(Modification Example in which Projection Image Correction LUT 403 is Stored as XYZ-RGB)

Further, in the present embodiment, the example is explained in which the LUT of RGBXYZ-RGB is used as the projection image correction LUT 403. However, the input of the LUT becomes six-dimensional, and therefore, the number of grid points is large and the storage capacity necessary for storing the LUT becomes large. Consequently, a modification example is explained in which as the projection image correction LUT 403, an LUT of XYZ-RGB is used, in which the input is the XYZ values of an overlap color and the output is the corrected projector RGB values.

Figure 7A:
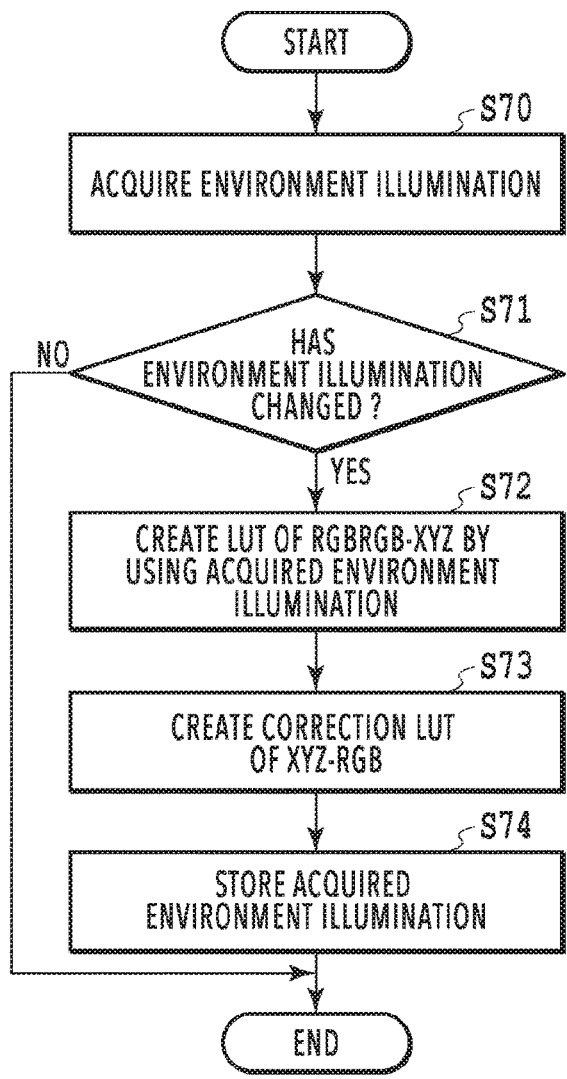
FIG. 7A and FIG. 7B are each a diagram showing a modification example of the flow chart of creating the projection image correction LUT 403.

FIG. 7A shows the flowchart of the projection image correction LUT creation processing in the projection image correction LUT creation unit 405.

The processing at S70, S71, S72, and S74 is the same as the processing at S60, S61, S62, and S64 described above, and therefore, explanation is omitted.

Figure 7B:
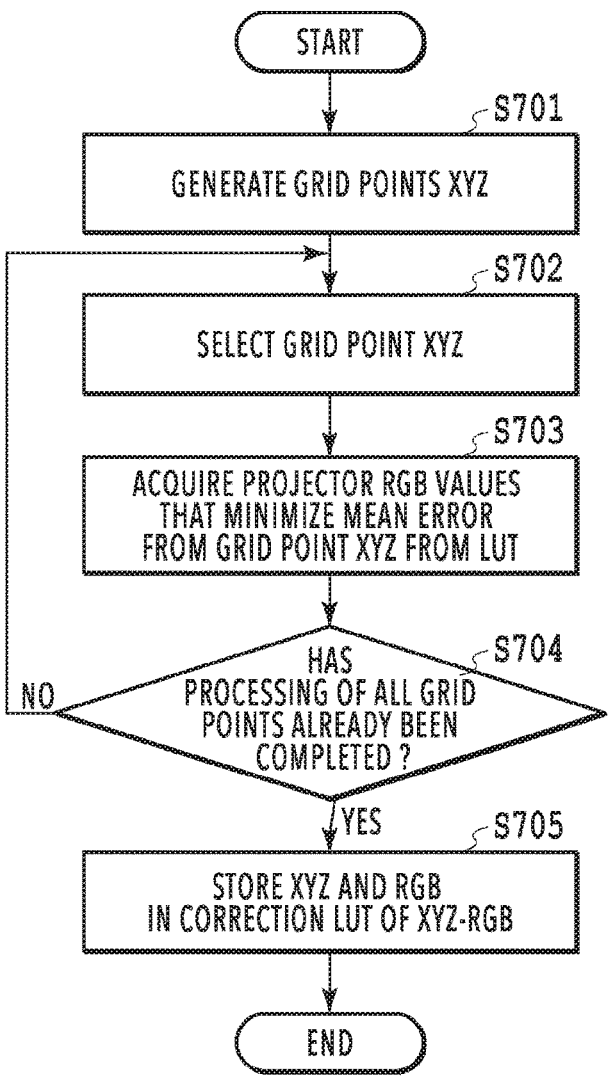

FIG. 7B shows the flowchart of creation processing of the projection image correction LUT of XYZ-RGB at S73.

First, at S701, the projection image correction LUT creation unit 405 generates XYZ grid signals. For example, values are generated to have five grids per color at equal intervals.

Next, at S702, the projection image correction LUT creation unit 405 acquires the XYZ values of one color, which correspond to one grid point among the grid signals generated at S701.

Then, at S703, the projection image correction LUT creation unit 405 acquires the projector RGB values that minimize the mean error from the XYZ values acquired at S702. Here, the mean error is a mean of errors after acquiring XYZ values at the time of overlapping certain projector RGB values on a plurality of printer RGB values from the LUT of RGBRGB-XYZ respectively and calculating errors from XYZ values of the above-described grid point.

S704 and S705 are the same as S604 and S605 described above, and therefore, explanation is omitted.

Second Embodiment

In the above-described embodiment, the example is explained in which the influence of the change in the environment illumination is compensated for by a projection image. However, in a case where the change in the environment illumination is large, it may happen that the influence cannot be compensated for by a projection image and the color of an input image cannot be reproduced faithfully. Consequently, in the present embodiment, an example is explained in which the color of an input image is reproduced faithfully even in a case where the change in the environment illumination is large by acquiring a range (hereinafter, variation range information) in which the environment illumination can change and determining the printer RGB values and the projector RGB values by using the variation range information. Explanation of the portions in common to those of the above-described embodiment is simplified or omitted.

Figure 8:
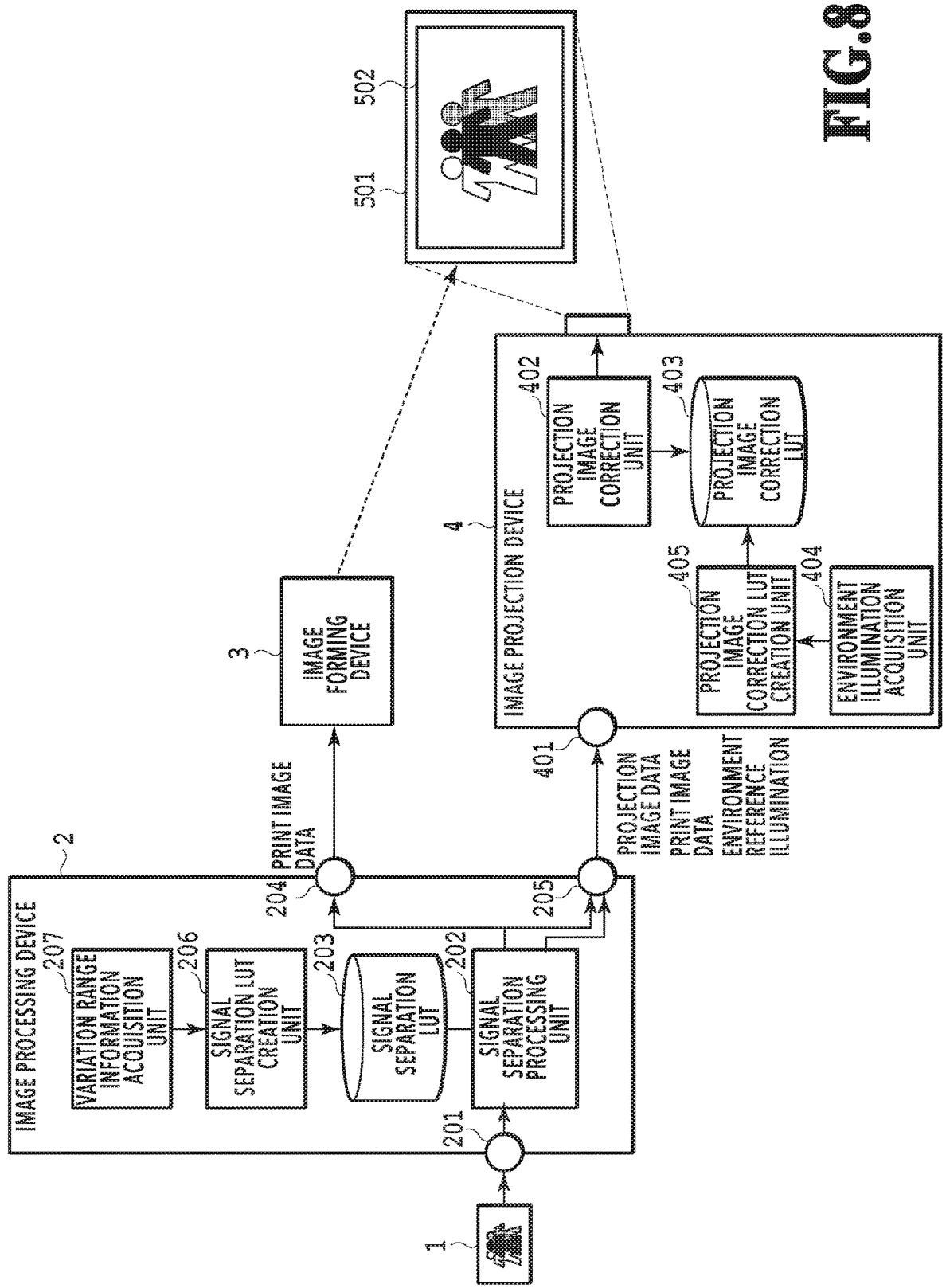
FIG. 8 is a block diagram showing a configuration of an image display system in a second embodiment.

FIG. 8 is a block diagram showing the configuration of the image display system in the present embodiment. The image processing device 2 in the present embodiment differs from that in the first embodiment in comprising a variation range information acquisition unit 207. Details of processing by the variation range information acquisition unit 207 will be described later.

The signal separation LuT creation unit 206 in the present embodiment acquires variation range information and creates the signal separation LUT 203. Details of the signal separation LUT creation processing will be described later.

(Acquisition of Variation Range Information)

Figure 9:
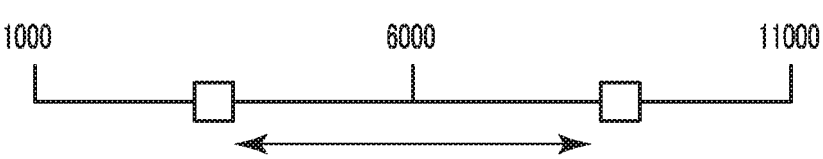
FIG. 9 is a diagram showing a UI for acquiring a variation range of environment illumination.

In the following, with reference to FIG. 9, the processing by the variation range information acquisition unit 207 is explained. It is possible for a user to set variation range information by using a GUI 900 shown in FIG. 9.

First, a user selects one of "Select light source" in which a plurality of kinds of light source of environment illumination is input. "Specify color temperature" in which a range of the color temperature of the environment illumination is input by numerical values, and "Specify spectral distribution" in which a plurality of spectral distribution profiles is specified by a checkbox. In a case where "Select light source" is selected, as candidates thereof, for example, fluorescent light, halogen, outdoors (midday), and the like are displayed. A user selects a plurality of kinds of supposed light source. Further, in a case where "Specify color temperature" is selected, by moving a slider bar to left and right, an upper limit and a lower limit of the color temperature are selected. Furthermore, in a case where "Specify spectral distribution" is selected, spectral distribution profile data acquired by a spectral sensor or the like is acquired. A user selects a plurality of supposed spectral profiles.

In the present embodiment, in a case where the candidates in "Select light source" and "Specify color temperature" are selected, it is assumed that the corresponding spectral distribution profiles are set in advance. The above-described plurality of spectral distribution profiles is sent out to the signal separation LUT creation unit 206 as variation range information.

(Creation Method of Signal Separation LUT 203)

In the following, the creation method of the signal separation LUT 203 in the present embodiment is explained. Explanation of the portions in common to those of the first embodiment is omitted. In the present embodiment, the calculation of an overlap color (S405) shown in FIG. 4B differs from that in the first embodiment.

At S405, first, the signal separation LUT creation unit 206 acquires variation range information from the variation range information acquisition unit 207. That is, a plurality of spectral distribution profiles of environment illumination is acquired. Further, the signal separation LUT creation unit 206 calculates a mean of the spectral distribution profiles and calculates S mean ($\lambda$) as a mean spectral distribution profile of environment illumination.

After that, the signal separation LUT creation unit 206 calculates the XYZ values of the overlap color, which correspond to the projector RGB values and the printer RGB values acquired at S402, by formula (2) below.

$$X(rgb1,rgb2)=\int\{S\ prj(rgb1,\lambda)+S\ \text{mean}(\lambda)\}R\ prn(rgb2,\lambda)x(\lambda)d\lambda$$

$$Y(rgb1,rgb2)=\int\{S\ prj(rgb1,\lambda)+S\ \text{mean}(\lambda)\}R\ prn(rgb2,\lambda)y(\lambda)d\lambda$$

$$Z(rgb1,rgb2)=\int\{S\ prj(rgb1,\lambda)+S\ \text{mean}(\lambda)\}R\ prn(rgb2,\lambda)z(\lambda)d\lambda \quad (2)$$

That is, in the present embodiment, the XYZ values of the overlap color are calculated by using the mean environment illumination S mean ($\lambda$) as the environment reference illumination in place of the environment illumination S ill ($\lambda$) used in formula (1).

(Reason that Mean Environment Illumination is Used)

In the following, the reason that the mean environment illumination S mean ($\lambda$) is used is explained by taking a specific example.

As an example, a case is considered where CIE daylight D50 is used as the environment reference illumination and the environment in which an overlap image is displayed is outdoor. In this case, in the time period of midday, the difference between the environment illumination acquired by the environment illumination acquisition unit 404 and S ill ($\lambda$) is small. Because of this, the correction amount by the projection image correction unit 402 is also small. However, in the time period of late afternoon and in a case where the tinge of red of the environment illumination acquired by the environment illumination acquisition unit 404 becomes strong (color temperature becomes low), the difference from S ill ($\lambda$) becomes large. As a result of that, there is a possibility that the correction amount by the projection image correction unit 402 exceeds the limit of correction.

On the other hand, in the present embodiment, in a case where it is known that the environment illumination at the time of displaying an overlap image changes in a range between midday (white, color temperature 8,000K) and late afternoon (red, color temperature 2,000K), the mean environment illumination S mean ($\lambda$) thereof (slightly reddish, color temperature 5,000K) is used as the environment reference illumination. The print image 501 that is formed at this time appears to be slightly bluish in a case where it is viewed in the time period of midday without projected light and appears to be slightly reddish in the time period of late afternoon. That is, in each time period, the difference between the acquired environment illumination and the environment reference illumination arises to the same extent, but it is unlikely that the difference becomes large. Because of this, it is possible to reduce the possibility that the limit of correction by the projection image correction unit 402 is exceeded.

As explained above, according to the present embodiment, even in a case where it is not possible to compensate for the change in the environment illumination by a projection image, it is possible to faithfully reproduce the color of an input image by determining the printer RGB Values and the projector RGB values by using the range in which the environment illumination can change.

(Modification Example Taking also into Consideration Color Reproduction Area of Projector)

It may also be possible to determine the environment reference illumination by using color reproduction range information on the image projection device 4, in addition to the variation range information on the environment illumination. For example, in a case where the color reproduction range of the image projection device 4 is large on the red side and small on the blue side, it is possible to more reduce the possibility that the limit of correction is exceeded by putting the environment reference illumination closer to the red side (putting the printed matter closer to the blue side). Consequently, for example, a spectral distribution is represented as Q prj ($\lambda$), which is obtained by acquiring a mean of the spectral distributions of the three colors of the projector RGB=(255, 0, 0), (0, 255, 0), (0, 0, 255) and performing offsetting so that the total of all the wavelengths becomes 0. In such a case, it is possible to perform the calculation of an overlap color at S405 by using formula (3) as follows.

$$X(rgb1,rgb2)=\int\{S\ prj(rgb1,\lambda)+S\ \text{mean}(\lambda)+Q\ prj(\lambda)\}R\ prn(rgb2,\lambda)x(\lambda)d\lambda$$

$$Y(rgb1,rgb2)=\int\{S\ prj(rgb1,\lambda)+S\ \text{mean}(\lambda)+Q\ prj(\lambda)\}R\ prn(rgb2,\lambda)y(\lambda)d\lambda$$

$$Z(rgb1,rgb2)=\int\{S\ prj(rgb1,\lambda)+S\ \text{mean}(\lambda)+Q\ prj(\lambda)\}R\ prn(rgb2,\lambda)z(\lambda)d\lambda \quad (3)$$

(Modification Example in which Environment Reference Illumination is Specified Directly on UI and Previewed)

In the present embodiment, the example is explained in which the mean of a plurality of kinds of environment illumination is used as the environment reference illumination, but the determination method of the environment reference illumination is not limited to this. For example, it may also be possible to perform different weighting for different environment illumination.

Figure 10:
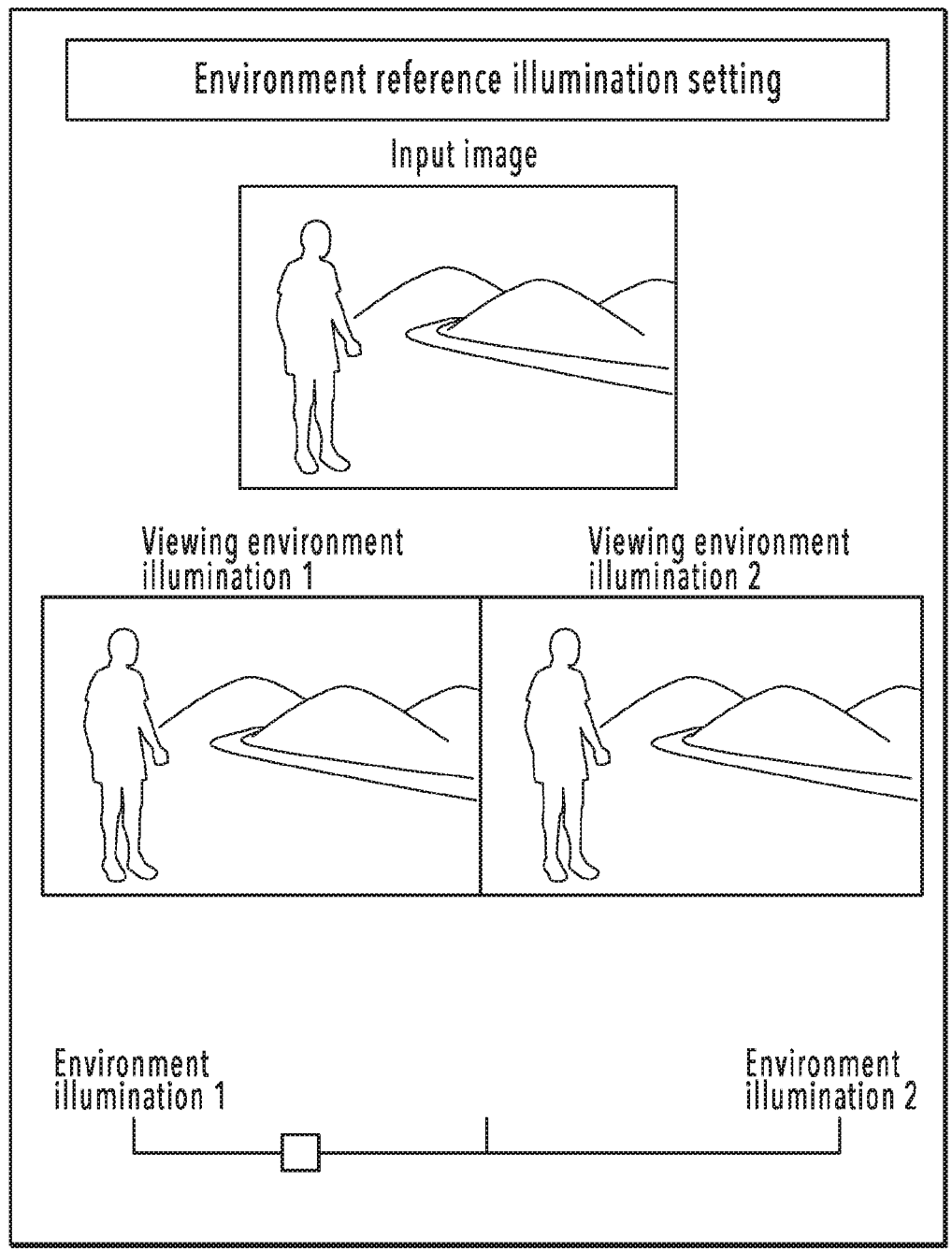
FIG. 10 is a diagram showing a UI for setting environment reference illumination.

Further, it may also be possible to display a preview screen and cause a user to directly set the environment reference illumination. FIG. 10 shows an example of an environment reference illumination setting UI 1000.

It is possible for a user to set the environment reference illumination by moving a slider bar to left and right, which is shown at the lower portion of the Environment reference illumination setting UI 1000, Further, in accordance with the movement of the slider bar, preview images are displayed at the upper portion of the Environment reference illumination setting UI 1000. Here, the preview images are images obtained by estimating overlap images at the upper limit and the lower limit of the variation range information acquired by the variation range information acquisition unit 207.

Consequently, in a case where the correction amount by the projection image correction unit 402 is within a correctable range, both the preview images are the same as the input image. On the other hand, in a case where the correction amount by the projection image correction unit 402 is outside the correctable range, at least one of the preview images will be an image different from the input image. It is possible for a user to adjust the environment reference illumination with the slider bar while determining whether or not the change can be accepted. It may also be possible to design a configuration in which only the area in which the preview image and the input image are different is extracted and displayed as an image. That is, the signal separation processing unit 202 generates the print image data and the projection image data so that the correction amount by the projection image correction unit 402 is within the correctable range for the predetermined range of the environment illumination information.

Modification Example

Figure 11:
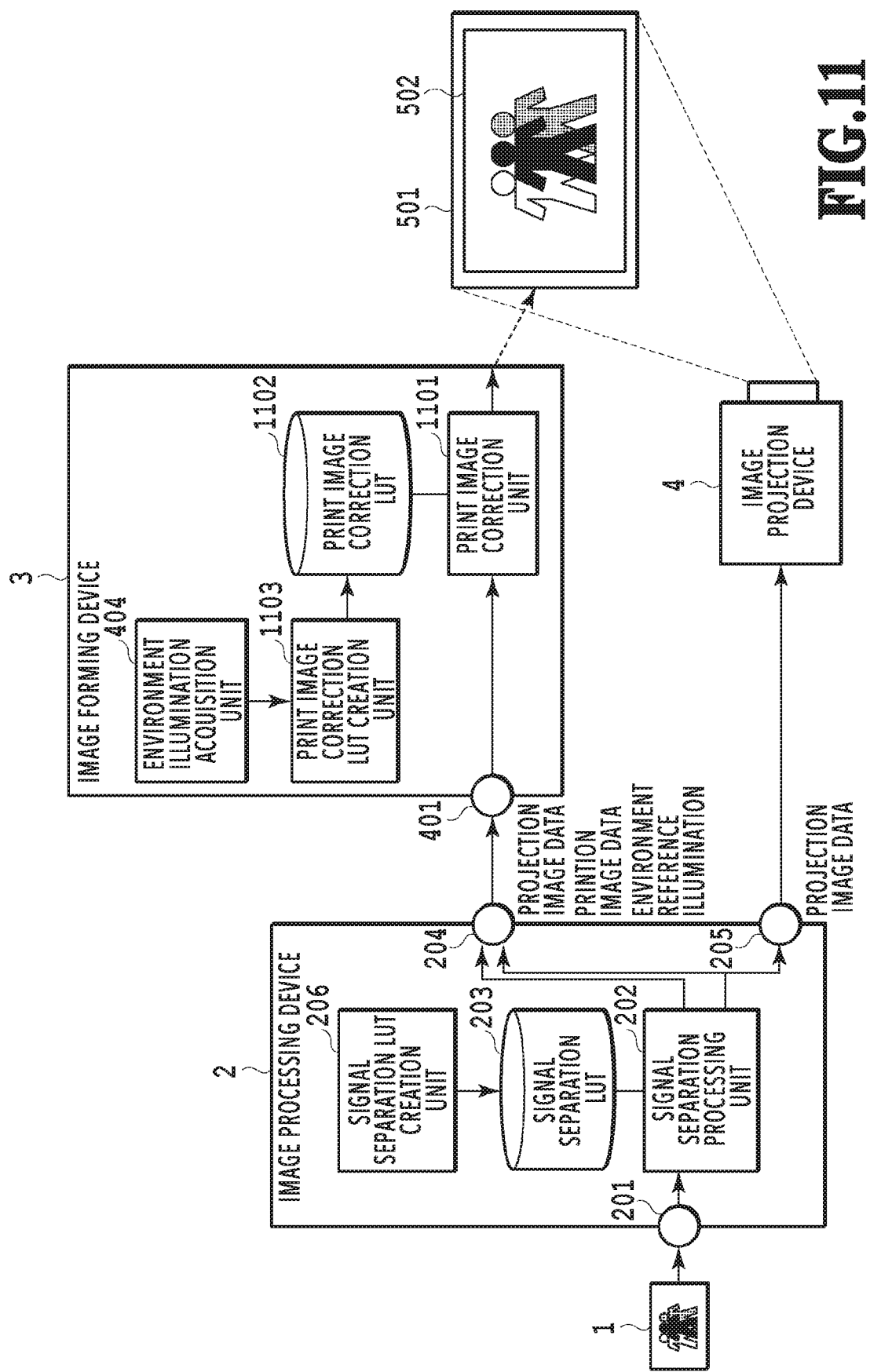
FIG. 11 is a block diagram showing a configuration of an image display system in a modification example.

In the above-described embodiment, the color variation that is given to the overlap color by the change in the environment illumination is compensated for by a projection image, but it may also be possible to compensate for the color variation by a print image. The configuration of the image display system in this case is shown in FIG. 11. A print image correction unit 1101 corrects print image data. A print image correction LUT creation unit 1103 creates a print image correction LUT 1102. It is possible to implement processing to correct print image data by replacing the projection image with the print image in the processing by the projection image correction unit 402, the projection image correction LUT 403, and the projection image correction LUT creation unit 405.

Figure 12:
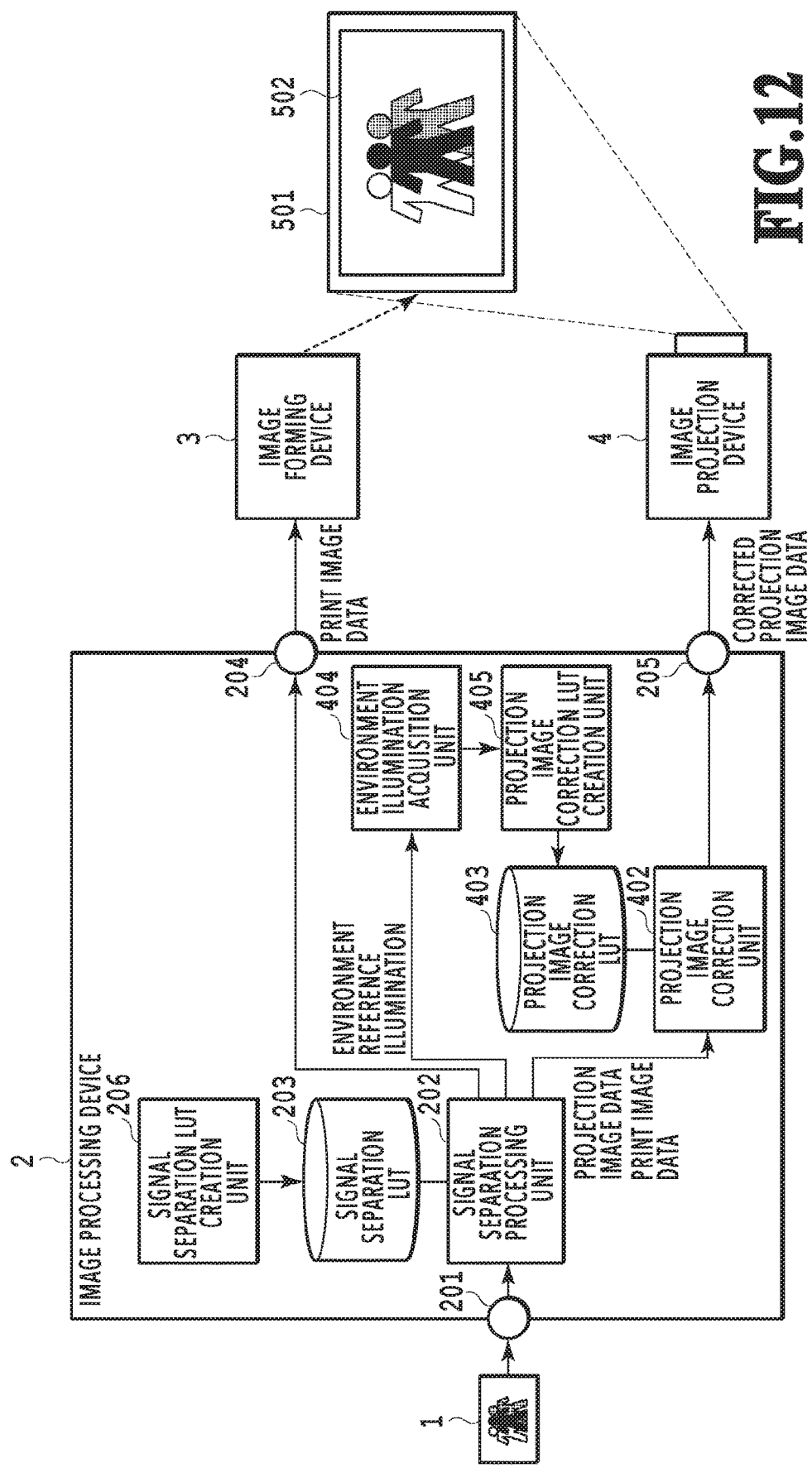
FIG. 12 is a block diagram showing a configuration of an image display system in a modification example.

Further, in the above-described embodiment, the projection image correction unit 402 is possessed by the image projection device 4, but the image processing device 2 may have the projection image correction unit 402. The configuration of the image display system in this case is shown in FIG. 12. As described above, it may also be possible to compensate for the color variation by a print image, and therefore, the image processing device 2 may have the print image correction unit 1101.

Further, in the above-described embodiment, a correction LUT is created based on environment illumination information, but the method of determining a correction LUT is not limited to the above-described example. For example, it may also be possible to select one correction LUT from among a plurality of kinds of correction LUT created in advance based on the environment illumination information.

Other Embodiments

It is possible to implement the present invention also by processing to supply programs implementing one or more functions of the above-described embodiments to a system or an apparatus via a network or a storage medium and cause one or more processors in a computer of the system or the apparatus to read and execute the programs. Further, it is also possible to implement the present invention by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to reproduce the color of an input image more faithfully under different environment illumination.

The present invention has been explained with reference to the embodiments, but it is needless to say that the present invention is not limited to the above-described embodiments. The scope of the following claims is to be accorded the broadest interpretation so as to encompass all such modifications and equivalent structures and functions.

The invention claimed is:

1. An image processing device that generates data for generating an overlap image by overlapping an image formed by an image forming device and an image projected by an image projection device, the image processing device comprising:
one or more memories that store a set of instructions; and
one or more processors that execute the instructions to cause the image processing device to:
acquire variation information that identifies variations in a brightness of environment illumination from a first environment to a second environment;
set, based on the variation information, environment reference illumination and generate, by separating a signal of input image data based on the set environment reference illumination, first image data for the image forming device and second image data for the image projection device;
acquire environment illumination information relating to environment illumination in generating the overlap image; and
correct the second image data based on the environment illumination information.

2. The image processing device according to claim 1, wherein the instructions, when executed by the one or more processors further cause the image processing device to:
generate a lookup table for correcting the second image data based on the environment illumination information and the first image data, and corrects the second image data based on the generated lookup table.

3. The image processing device according to claim 1, wherein
the environment illumination information is information obtained by measuring the environment illumination using a sensor.

4. The image processing device according to claim 3, wherein
the environment illumination information is information obtained by measuring the environment illumination using a spectral sensor.

5. The image processing device according to claim 1, wherein
the environment illumination information is an information represents a spectral distribution of the environment illumination.

6. The image processing device according to claim 1, wherein the instructions, when executed by the one or more processors further cause the image processing device to:
generate the first image data and the second image data so that a correction amount in a correction performed is within a correctable range for a predetermined range of the environment illumination information.

7. The image processing device according to claim 1, wherein the instructions, when executed by the processor further cause the image processing device to:
acquire a color reproduction range of the image projection device, and
generate the first image data and the second image data based on the variation information and the color reproduction range.

8. The image processing device according to claim 1, wherein
the environment reference illumination is determined in accordance with designation of a user.

9. The image processing device according to claim 8, wherein the instructions, when executed by the processor further cause the image processing device to:
display a user interface for the user to designate the environment reference illumination, and
display an area in which a correction amount in a correction performed is not within the correctable range on the user interface.

10. The image processing device according to claim 1, wherein the instructions, when executed by the processor further cause the image processing device to:
perform correction so as to compensate for a change in color of the overlap image in accordance with a change in the environment illumination.

11. A non-transitory computer readable storage medium storing a program for causing a computer to perform an image processing method of generating data for generating an overlap image by overlapping an image formed by an image forming device and an image projected by an image projection device, the image processing method comprising:
acquiring variation information that identifies variations in a brightness of environment illumination from a first environment to a second environment
setting, based on the variation information, environment reference illumination;
generating, by separating a signal of input image data based on the set environment reference illumination, first image data for the image forming device and second image data for the image projection device;
acquiring environment illumination information relating to environment illumination in generating the overlap image; and
correcting the second image data based on the environment illumination information.

12. The image processing device according to claim 1, wherein the instructions, when executed by the processor further cause the image processing device to:
correct the second image data based on the first image data and the environment illumination information.

13. A computer-implemented method for generating data for generating an overlap image by overlapping an image formed by an image forming device and an image projected by an image projection device, the computer-implemented method comprising:
acquiring variation information that identifies variations in a brightness of environment illumination from a first environment to a second environment;
setting, based on the variation information, environment reference illumination;
generating, by separating a signal of input image data based on the set environment reference illumination, first image data for the image forming device and second image data for the image projection device;
acquiring environment illumination information relating to environment illumination in generating the overlap image; and
correcting the second image data based on the environment illumination information.

14. The image processing device according to claim 1, wherein the instructions, when executed by the processor further cause the image processing device to:
set, as the environment reference illumination, environment illumination having an average brightness between a brightness of illumination of the first environment and a brightness of illumination of the second environment.

* * * * *